United States Patent
Akkiraju et al.

(10) Patent No.: US 10,831,796 B2
(45) Date of Patent: Nov. 10, 2020

(54) TONE OPTIMIZATION FOR DIGITAL CONTENT

(71) Applicant: International Business Machines Corporation, Armonk, NY (US)

(72) Inventors: Rama K. Akkiraju, Cupertino, CA (US); Hernan Badenes, Neuquen (AR); Richard P. Gabriel, Redwood City, CA (US); Liang Gou, San Jose, CA (US); Pritam S Gundecha, San Jose, CA (US); Jalal U. Mahmud, San Jose, CA (US); Vibha S. Sinha, Santa Clara, CA (US); Bin Xu, Ithaca, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/406,747

(22) Filed: Jan. 15, 2017

(65) Prior Publication Data
US 2018/0203847 A1 Jul. 19, 2018

(51) Int. Cl.
*G06F 17/27* (2006.01)
*G06F 16/332* (2019.01)
*G06F 40/253* (2020.01)
*G06F 40/247* (2020.01)

(52) U.S. Cl.
CPC ........ *G06F 16/3329* (2019.01); *G06F 40/253* (2020.01); *G06F 40/247* (2020.01)

(58) Field of Classification Search
CPC .............. G06F 17/274; G06F 17/2785; G06F 2203/011
USPC .................................................... 704/9, 270.1
See application file for complete search history.

(56) References Cited

U.S. PATENT DOCUMENTS

| | | | | |
|---|---|---|---|---|
| 5,987,415 | A | * 11/1999 | Breese | G10L 17/26 704/270 |
| 7,089,218 | B1 | * 8/2006 | Visel | G06F 17/271 704/E17.002 |
| 7,136,816 | B1 | * 11/2006 | Strom | G10L 13/10 704/260 |
| 7,958,117 | B2 | 6/2011 | Pettinati et al. | |
| 2002/0194002 | A1 | * 12/2002 | Petrushin | G10L 17/26 704/270 |
| 2003/0191627 | A1 | * 10/2003 | Au | G06F 17/2785 704/9 |
| 2004/0179039 | A1 | * 9/2004 | Blattner | G06T 13/40 715/758 |
| 2005/0192801 | A1 | * 9/2005 | Lewis | G10L 15/18 704/240 |
| 2007/0162505 | A1 | * 7/2007 | Cecchi | G06F 17/30997 |

(Continued)

OTHER PUBLICATIONS https://www.ibm.com/watson/services/tone-analyzer/.
(Continued)

*Primary Examiner* — Jakieda R Jackson (57) ABSTRACT

An approach is provided that provides a tone optimization recommendation. The approach obtains a current tone inferred from digital content and a desired tone inference for a target audience. A tone optimization recommendation to reduce a difference between the current tone and the desired tone is determined using a processor. A memory is modified to save the tone optimization recommendation. The tone optimization recommendation is provided.

20 Claims, 7 Drawing Sheets

(56) References Cited

U.S. PATENT DOCUMENTS

| | | | |
|---|---|---|---|
| 2007/0300286 A1* | 12/2007 | Judge | G06F 21/554 726/1 |
| 2008/0147413 A1* | 6/2008 | Sobol-Shikler | G10L 13/033 704/278 |
| 2008/0183710 A1* | 7/2008 | Serjeantson | G06F 17/2705 |
| 2008/0269958 A1* | 10/2008 | Filev | B60W 50/10 701/1 |
| 2009/0287685 A1* | 11/2009 | Charnock | G06F 17/30722 |
| 2010/0063880 A1* | 3/2010 | Atsmon | G06Q 10/0637 705/14.53 |
| 2010/0100907 A1* | 4/2010 | Chang | G06F 3/01 725/46 |
| 2010/0145940 A1* | 6/2010 | Chen | G06F 17/30705 707/736 |
| 2010/0325218 A1* | 12/2010 | Castro | G06Q 50/01 709/206 |
| 2011/0064388 A1* | 3/2011 | Brown | G06T 13/20 386/285 |
| 2011/0078167 A1* | 3/2011 | Sundaresan | G06F 17/2785 707/765 |
| 2011/0082698 A1* | 4/2011 | Rosenthal | A61B 5/11 704/270.1 |
| 2012/0137367 A1* | 5/2012 | Dupont | G06F 21/00 726/25 |
| 2012/0179751 A1* | 7/2012 | Ahn | G06Q 30/0282 709/204 |
| 2012/0246054 A1* | 9/2012 | Sastri | G06Q 40/06 705/37 |
| 2012/0278064 A1* | 11/2012 | Leary | G06F 17/274 704/9 |
| 2012/0323928 A1* | 12/2012 | Bhatia | H04L 51/02 707/748 |
| 2013/0018824 A1* | 1/2013 | Ghani | G06N 99/005 706/12 |
| 2013/0080260 A1* | 3/2013 | French | H04H 60/33 705/14.66 |
| 2013/0097176 A1* | 4/2013 | Khader | G06Q 30/0251 707/748 |
| 2013/0103623 A1* | 4/2013 | Burstein | G06N 99/005 706/12 |
| 2013/0231922 A1* | 9/2013 | Park | G06F 17/2735 704/9 |
| 2013/0282481 A1* | 10/2013 | Kent | G06Q 30/0251 705/14.49 |
| 2013/0288212 A1 | 10/2013 | Bist | |
| 2013/0325437 A1* | 12/2013 | Lehman | G06F 40/30 704/9 |
| 2014/0067370 A1* | 3/2014 | Brun | G06F 17/271 704/9 |
| 2014/0088944 A1* | 3/2014 | Natarajan | G06Q 30/02 703/13 |
| 2014/0088952 A1* | 3/2014 | Fife | G06F 17/27 704/9 |
| 2014/0108006 A1* | 4/2014 | Vogel | G06F 17/28 704/9 |
| 2014/0160149 A1* | 6/2014 | Blackstock | G06N 3/006 345/619 |
| 2014/0195221 A1 | 7/2014 | Frank et al. | |
| 2014/0358546 A1* | 12/2014 | Fernandez | G10L 13/10 704/259 |
| 2015/0185996 A1* | 7/2015 | Brown | G06F 3/04817 715/706 |
| 2015/0242391 A1 | 8/2015 | Goel et al. | |
| 2015/0286619 A1* | 10/2015 | Chakra | G06F 17/28 704/9 |
| 2015/0347391 A1 | 12/2015 | Chen et al. | |
| 2015/0348569 A1* | 12/2015 | Allam | G10L 25/48 704/257 |
| 2015/0371663 A1* | 12/2015 | Gustafson | G10L 15/265 704/270.1 |
| 2016/0055250 A1* | 2/2016 | Rush | G06Q 50/01 707/733 |
| 2016/0104486 A1* | 4/2016 | Penilla | H04L 67/12 704/232 |
| 2016/0117329 A1* | 4/2016 | Busey | G06F 17/3053 707/726 |
| 2016/0210963 A1* | 7/2016 | Kim | G10L 15/1822 |
| 2016/0241533 A1 | 8/2016 | Bist | |
| 2017/0011210 A1* | 1/2017 | Cheong | A61B 5/0022 |
| 2017/0083817 A1* | 3/2017 | Di Sciullo | G06N 5/025 |
| 2017/0109340 A1 | 4/2017 | Chen et al. | |
| 2017/0308399 A1* | 10/2017 | Wardell | G06F 9/5027 |
| 2018/0075775 A1* | 3/2018 | Conway | G09B 7/00 |
| 2018/0095624 A1* | 4/2018 | Osman | G06T 19/006 |

OTHER PUBLICATIONS

Gou, Liang, Michelle X. Zhou, and Huahai Yang. KnowMe and ShareMe: understanding automatically discovered personality traits from social media and user sharing preferences. Proceedings of the SIGCHI Conference on Human Factors in Computing Systems (2014): pp. 955-964.

Jian, Zhao, Liang Gou, Wang Fei, and Michelle X. Zhou. PEARL: An Interactive Visual Analytic Tool for Understanding Personal Emotion Style Derived from Social Media. In Proc. of IEEE VAST (2014).

Byron, Kristin. Carrying too Heavy a Load? The Communication and Miscommunication of Emotion by Email. Academy of Management Review, vol. 33(2) (2008): pp. 309-327.

Barrick, Murray R., and Michael K. Mount. The Big Five Personality Dimensions and Job Performance: A Meta-Analysis. Personnel Psychology, vol. 44(1) (Mar. 1991): pp. 1-26.

Dimicco, Joan M., and David R. Millen. Identity Management: Multiple Presentations of Self in Facebook. In Proceedings of the 2007 International ACM Conference on Supporting Group Work (2007). pp. 383-386. New York, NY, USA: ACM.

Xuan Zhao, and Siân. E Lindley. 2014. Curation through use: understanding the personal value of social media. In Proceedings of the 32nd annual ACM conference on Human factors in computing systems. ACM, 2431-2440.

Xuan Zhao, Niloufar Salehi, Sasha Naranjit, Sara Alwaalan, Stephen Voida, and Dan Cosley. 2013. The many faces of Facebook: Experiencing social media as performance, exhibition, and personal archive. In Proceedings of the SIGCHI Conference on Human Factors in Computing Systems. ACM, 1-10.

Gou, L, Mahmud, J. U., Haber, E. M., A. & Zhou, M. X. (2013). PersonalityViz: A Visualization Tool to Analyze People's Personality with Social Media. In Proc. of the Companion Publication of the 2013 International Conference on Intelligent User Interfaces (IUI '13): 45-46.

Wang, Y., Gou, L., Xu, A., Zhou, M. X., Yang, H. & Badenes, H. (2015). VeilMe: An Interactive Visualization Tool for Privacy Configuration of Using Personality Traits. In Proceedings of the SIGCHI Conference on Human Factors in Computing Systems (CHI '15), pp. 817-826.10.

Elizabeth Thiry, Siân Lindley, Richard Banks, and Tim Regan. 2013. Authoring personal histories: exploring the timeline as a framework for meaning making. In Proceedings of the SIGCHI Conference on Human Factors in Computing Systems (CHI '13). ACM, New York, NY, USA, 1619-1628.

Crystalknows. http://www.crystalknows.com/.

Pablo N Mendes, Chris Kau, Alfredo Alba, Steve Welch, Daniel Gruhl, Neal Lewis, Clemens Drews You ain't from around here, are you? Message authoring guidance in social media. In proc. of SWC 2014.

ToneCheck. http://tonecheck.com/.

Foxtype. http://labs.foxtype.com/politeness.

James W Pennebaker, Martha E Francis, and Roger J Booth. 2001. Linguistic inquiry and word count: LIWC 2001. Mahway: Lawrence Erlbaum Associates 71 (2001), 2001.

Tal Yarkoni. 2010. Personality in 100,000 words: A large-scale analysis of personality and word use among bloggers. Journal of research in personality 44, 3 (2010), 363-373.

(56) References Cited

OTHER PUBLICATIONS

Pablo N. Mendes, Daniel Gruhl, Clemens Drews, Chris Kau, Neal Lewis, Meena Nagarajan, Alfredo Alba, Steve Welch. Sonora: A Prescriptive Model for Message Authoring on Twitter. WISE 2014. www.facebook.com (View As / What Others See: let you see the view that someone else has of your profile page).
Bin Xu, Liang Gou, Anbang Xu, Dan Cosley, Jalal Mahmud, Insight Me: Raising Awareness of Conveyed Personality in Social Media Traces, May 16, Proceedings of the Tenth International AAAI Conference on Web and Social Media (ICWSM 2016).

* cited by examiner

TONE OPTIMIZATION FOR DIGITAL CONTENT

BACKGROUND

People often use information handling systems to share information via digital content. A few examples of digital content include a post to a social media group, an email to a business associate, and a text message to a friend.

SUMMARY

An approach for providing a tone optimization recommendation for digital content is described. A current tone inferred from the digital content and a desired tone inference for a target audience are obtained. A tone optimization recommendation to reduce a difference between the current tone and the desired tone is determined using a processor. A memory is modified to save the tone optimization recommendation. The tone optimization recommendation is provided.

A system is also provided. The system includes a tone analysis module and a tone optimization module. The tone analysis module obtains digital content and analyzes the digital content, resulting in a current tone. The tone optimization module is operatively coupled to the tone analysis module. The tone optimization module obtains the current tone. The tone optimization module provides an optimization recommendation to optimize the current tone of the digital content to achieve a desired tone.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

FIGS. 1-7 depict an approach for providing a tone optimization recommendation. The approach may obtain a current tone inferred from digital content and a desired tone inference for a target audience. A tone optimization recommendation to reduce a difference between the current tone and the desired tone may be determined using a processor. A memory may be modified to save the tone optimization recommendation. The tone optimization recommendation may be provided.

The approach may include a tone analysis module to obtain digital content and analyze the digital content. A tone optimization module may be operatively coupled to the tone analysis module. The tone optimization module may obtain the current tone and may provide an optimization recommendation to optimize the digital content to achieve a desired tone.

The approach may involve a plurality of different types of tones. Examples of tone types include social tones and emotional tones. Examples of social tones may include the Big 5 global personality factors, for example, openness to experience, conscientiousness, extraversion, agreeableness, and neuroticism. The Big 5 personality factors may sometimes be listed under the acronym "OCEAN." Beneath each of the Big 5 global personality factors there may be a number of correlated and more specific primary factors that may be identified. For example, extraversion may be said to include related qualities such as gregariousness and assertiveness. Emotional tones may be used to describe someone's current emotional state. Examples of emotional tones may include happy, sad, or angry.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
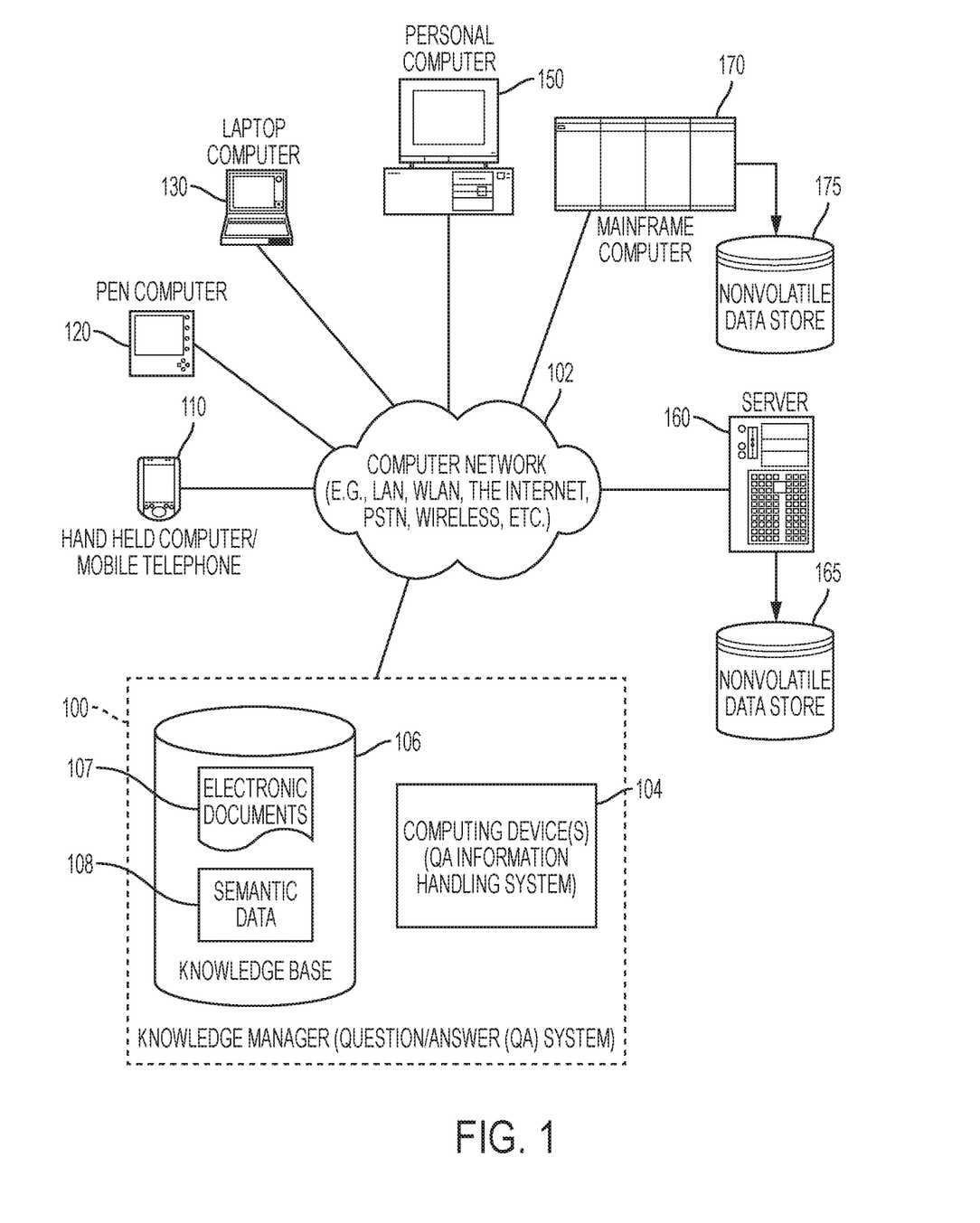
FIG. 1 depicts a schematic diagram of one illustrative embodiment of a question answering (QA) system in a computer network.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
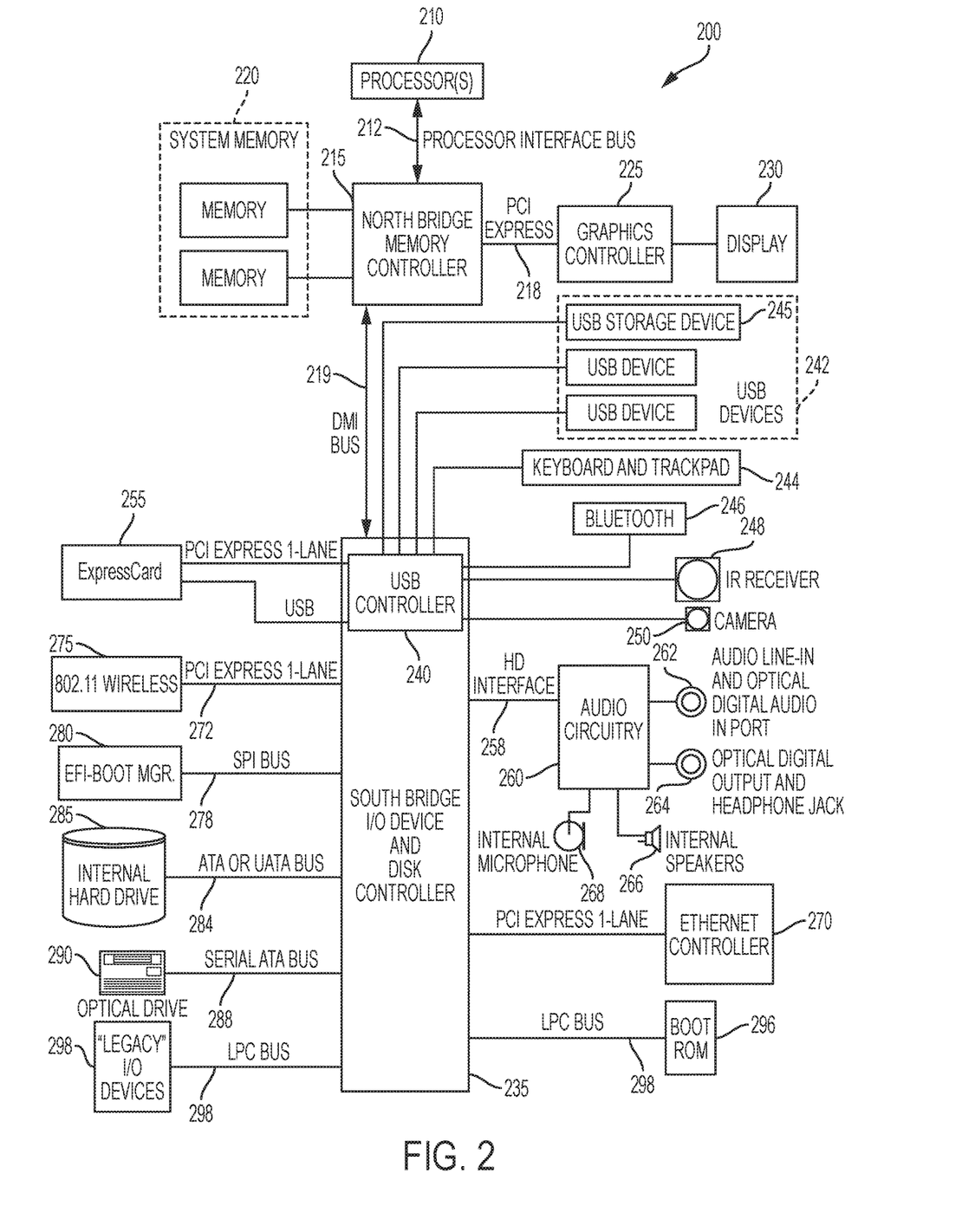
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
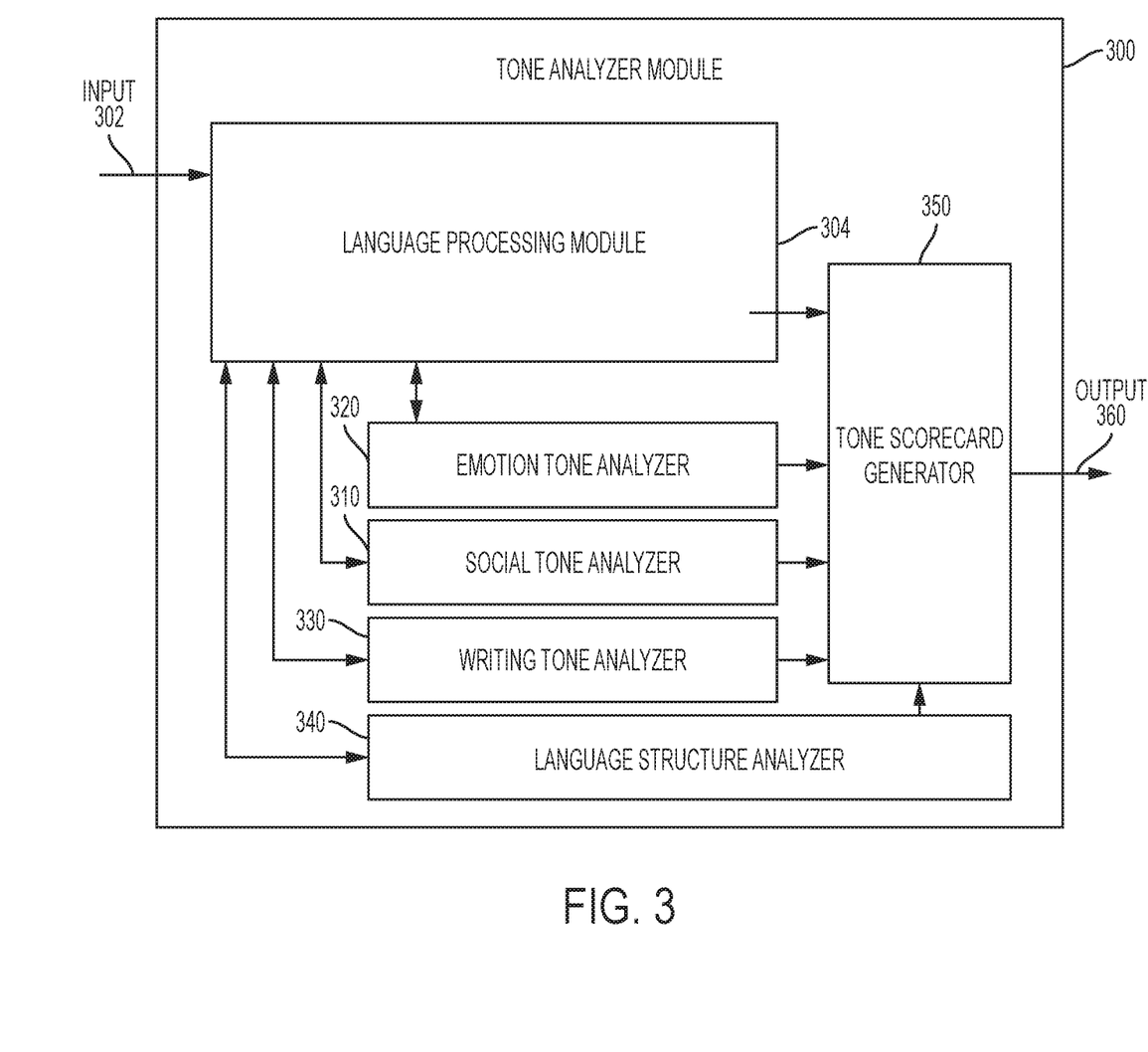
FIG. 3 is an exemplary diagram depicting a tone analysis module utilized in analyzing a tone of digital content.

FIG. 3 is an exemplary diagram depicting a tone analysis module 300 utilized in analyzing a tone of digital content. The tone analysis module 300 may analyze digital content for a variety of types of tones. In some embodiments, the tone analysis module 300 may obtain digital content from a user as input 302. In some embodiments, the tone analysis module 300 may obtain digital content from an input source adaptor as input 302.

Embodiments of an input source adaptor may take a variety of digital footprints from a user, such as, for example, emails, social media posts, and content from webpages. The input source adaptor may extract different media types, such as, for example, text, images, and videos. An embodiment of an input source adaptor may include an email plugin that can extract the email content from a user's email box for later analysis.

The tone analysis module 300 may include a language processing module 304 for language processing functionality. For example, the language processing module 304 may identify a language (such as, e.g., "English" or "Spanish") and perform natural language processing.

The tone analysis module 300 may analyze digital content for a variety of types of tones. For example, a social tone analyzer 310 may analyze digital content for social tones such as, for example, social tones from a Big 5 personality prediction model such as extraversion, agreeableness, openness, conscientiousness and neuroticism. A social tone prediction model may be built by collecting training data on large-scale psychometric studies on Amazon Mechanical Turk. For each social trait, an item-based survey can be used to collect a participant's psychometric score describing his social trait along each dimension. The item-based survey can include digital content generated by the participant, such as, for example, blogs, tweets, and Facebook posts. Using the digital content generated by the participant, a social tone prediction model can be built using linguistic features to predict a Big 5 personality score along each dimension. Examples of linguistic features that the social tone prediction model can use include, for example, using n-gram analysis and a linguistic inquiry and word count (LIWC) dictionary. In a LIWC dictionary, word categories may be defined to capture a participant's social state. A participant's posts may be decomposed as a bag of words using standard processing techniques. A social trait may be computed using a linear combination of relevant LIWC category scores. Each LIWC category score may be the normalized frequency of the words that belong to the LIWC category and are also used in the posts. The final trait score may then be normalized and converted into a percentile score over a large trait score pool built using many participants. The social tone prediction model may be a statistical model that can be used to infer a social tone about someone based on their writing. Similar prediction models can be built for other types of tones.

The tone analysis module 300 may also include an emotional tone analyzer 320 that may analyze digital content for emotional tones such as, for example, anger, joy, and sadness. A writing tone analyzer 330 may analyze digital content for a writing tone such as, for example, a level of formality associated with the digital content. A language structure analyzer 340 may analyze digital content for language structure such as, for example, syntax.

Implementations of the emotional tone analyzer 310, the social tone analyzer 320, the writing tone analyzer 330, and the language structure analyzer 340 may be implemented using a lexicon rule based approach and/or a machine learning approach.

Embodiments of the tone analysis module 300 may include a tone scorecard generator 350. The tone scorecard generator 350 may use the analysis from the social tone analyzer 310, the emotional tone analyzer 320, the writing tone analyzer 330, and the language structure analyzer 340 to generate a tone scorecard. The tone scorecard may include a current tone inferred from the digital content, for example, a social tone that is inferred by the social tone analyzer 310.

The tone analysis module 300 may keep an explanation for the inferred tone. For example, in a social tone prediction model an "agreeableness" tone may be positively correlated to a dictionary category of "inclusive" which includes words such as "us," "with," and "along." These words in the corresponding dictionary category can serve as an explanation for the social tone inferred from the digital content to help a user understand what linguistic features can contribute to a tone. For example, the explanation may explain which words and phrases contribute to the tone. The tone scorecard may include the explanation for the inferred tone. The tone scorecard may be included in the output 360 of the tone analysis module 300.

Figure 4:
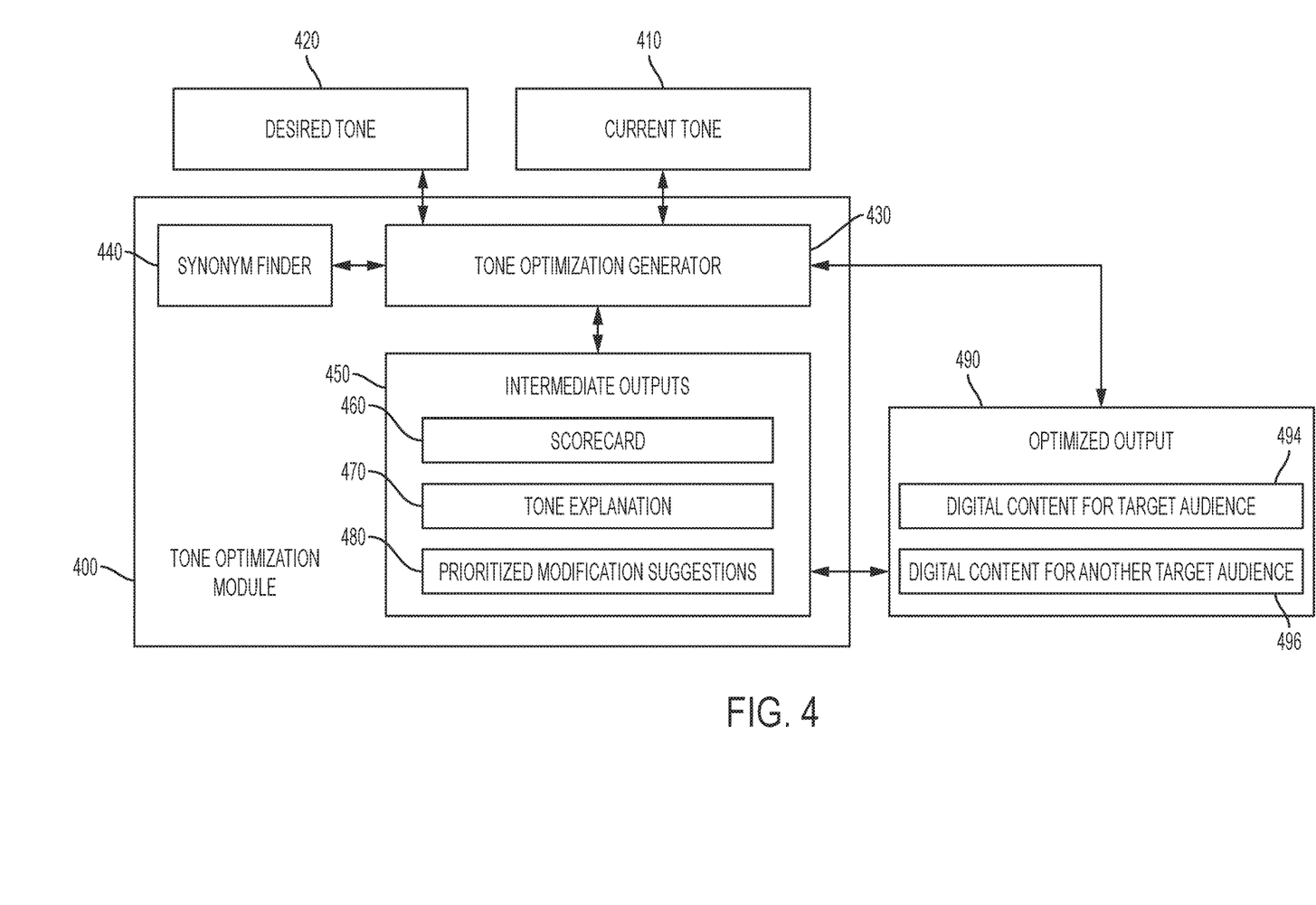
FIG. 4 is an exemplary diagram depicting a tone optimization module utilized in providing a tone optimization recommendation.

FIG. 4 is an exemplary diagram depicting a tone optimization module used in providing a tone optimization recommendation. The tone optimization module 400 obtains a current tone 410 and a desired tone 420. The current tone 410 may be a current tone scorecard from the output 360 of the tone analysis module 300. In some embodiments, the desired tone 420 may be derived from content created by a target audience. For example, people with a high level of agreeableness may have a higher tolerance for emotional context. As another example, the desired tone 420 could be derived by an expected mean of the user's past tones. In some embodiments, the desired tone 420 may be obtained by rules derived from previous empirical studies. In some embodiments, the desired tone 420 may be obtained from analyzing a tone used by a role model. In some embodiments, the desired tone 420 may be from the output 360 of the tone analysis module 300. In some embodiments, the desired tone 420 may be provided by a user of the tone optimization generator 400.

A tone optimization generator 430 may obtain the current tone 410 and the desired tone 420. The desired tone 420 may be provided in a desired tone scorecard. The tone optimization generator 430 may prioritize tone optimization recommendations based on different desired tones for different target audiences. The optimization may be done at a word level, a sentence level, and/or a post/document level. For any given desired tone 420, the prioritization may be implemented by optimizing a current tone scorecard and a desired tone scorecard.

The tone optimization generator 430 may determine a tone optimization recommendation to reduce a difference between the current tone and the desired tone. Reducing a difference between the current tone and the desired tone may be based on distance/similarity measures including, for example, Euclidean distance, Cosine similarity, Manhattan distance, distance correlation, and/or Jaccard index. A tone optimization recommendation may be determined using a processor. A memory may be modified to store the tone optimization recommendation.

The tone optimization generator 430 may determine a tone optimization recommendation at a word level. The tone optimization generator 430 may utilize a synonym finder 440 to assist with determining the tone optimization recommendation at a word level. For example, the tone optimization generator 430 may search for synonyms of a word using the synonym finder 440 and may determine whether a synonym will modify the current tone based on a correlation learned from prediction models introduced in the tone analysis module 300 such as, for example, the social tone analyzer 310, the emotional tone analyzer 320, the writing tone analyzer 330, and the language structure analyzer 340. Examples of modifying the current tone may include strengthening or weakening the current tone.

The tone optimization generator 430 may determine a tone optimization recommendation at a sentence level. The tone optimization generator 430 may use linguistic rules to generate similar sentences that modify the current tone. The linguistic rules may be generated using existing digital content as a template and replacing words or phrases based on synonyms generated using the synonym finder 440, wherein the synonyms may be generated using specific words from the existing digital content. Determining a tone optimization recommendation at a sentence level may utilize a sense-making technique.

In some embodiments, the tone optimization module 400 may include intermediate outputs 450. The intermediate outputs 450 may include a tone scorecard 460, a tone explanation 470, and prioritized modification suggestions 480. The tone scorecards 460 may include a current tone scorecard and an updated current tone scorecard. An interactive user interface may be used to provide the tone scorecards 460, the tone explanation 470, and the prioritized modification suggestions 480 to a user. The interactive user interface may use the tone scorecards 460 and the tone explanation 470 may show a user how the tones are inferred and may show a context for inferring the tones. The interactive user interface may show the prioritized modification suggestions 480 indicating what digital content is recommended for change and what the recommended changes include. The interactive user interface may highlight revision suggestions. A user may interact with the interactive user interface to iteratively determine which tone optimization recommendation to implement resulting in optimized output 490. The tone optimization module 400 may automatically implement the tone optimization recommendation resulting in optimized output 490.

The optimized output 490 may include digital content for a target audience 494 and digital content for another target audience 496. The digital content for a target audience 494 and the digital content for another target audience 496 may be optimized for a desired tone inference for each target audience. A desired tone inference may be different for a plurality of target audiences. The desired tone inference may have some similarities among a plurality of target audiences.

Figure 5:
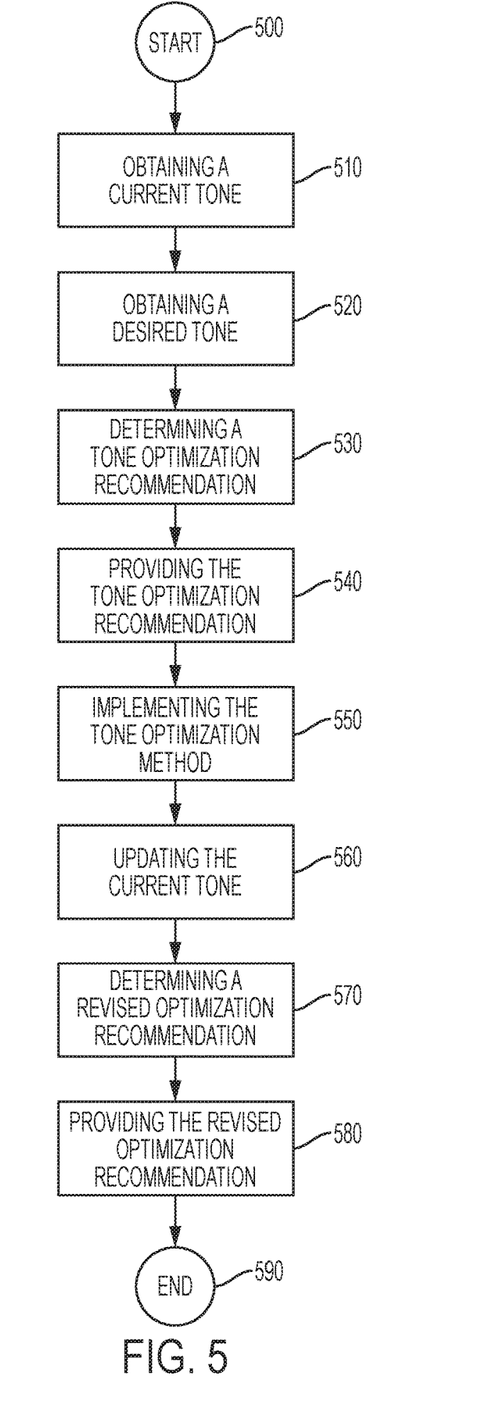
FIG. 5 is an exemplary flowchart that illustrates a process for providing a tone optimization recommendation.

FIG. 5 is an exemplary flowchart that illustrates a process for providing a tone optimization recommendation. The process commences at 500 and shows steps that may be taken to provide a tone optimization recommendation. At step 510, the tone optimization module 400 may obtain a current tone 410. The current tone 410 may be included in a tone scorecard that may include information regarding a plurality of tone types and a plurality of tone scores.

At step 520, the tone optimization module 400 may obtain a desired tone 420. The desired tone 420 may be obtained from an input of a desired tone by a user. The desired tone 420 may be obtained from an output 360 from the tone analysis module 300 wherein the desired tone 420 was derived from digital content, such as, for example, a user's own previous digital content, a digital content associated with a target audience, or a digital content associated with a role model.

At step 530, the tone optimization generator 430 may determine a tone optimization recommendation. The tone optimization recommendation may be determined using a processor. The tone optimization recommendation may be to reduce a difference between the current tone 410 and the desired tone 420. The tone optimization recommendation may be target audience specific. The tone optimization recommendation may include an optimization to optimize a plurality of tones and a plurality of tone types for a plurality of target audiences. A memory may be modified to store the tone optimization recommendation.

At step 540, the tone optimization recommendation may be provided. The tone optimization recommendation may be provided at a word, sentence, and/or post/document level. The tone optimization recommendation may be provided to a user. Providing the tone optimization recommendation may include prioritizing modification suggestions for the digital content and providing the prioritized modification suggestions. The tone optimization recommendation may be provided as a suggestion to modify the digital content. The tone optimization recommendation may be provided using a visual depiction in an interactive user interface.

At step 550, the tone optimization recommendation may be implemented. The tone optimization recommendation may be implemented by the tone optimization module 400. The tone optimization recommendation may be implemented by a user.

At step 560, the current tone 410 may be updated. A tone scorecard 460 may be updated to include the updated current tone. The tone scorecard 460 may be associated with a tone explanation 470 and prioritized modification suggestions 480.

At step 570, a revised optimization recommendation may be determined. The revised optimization recommendation may reduce a difference between the updated current tone and the desired tone 420. The revised optimization recommendation may be an iterative process.

At step 580, the revised optimization recommendation is provided. The revised optimization recommendation may be provided to a user. The revised optimization recommendation may be provided via an interactive user interface. The FIG. 5 process thereafter ends at 590.

Figure 6:
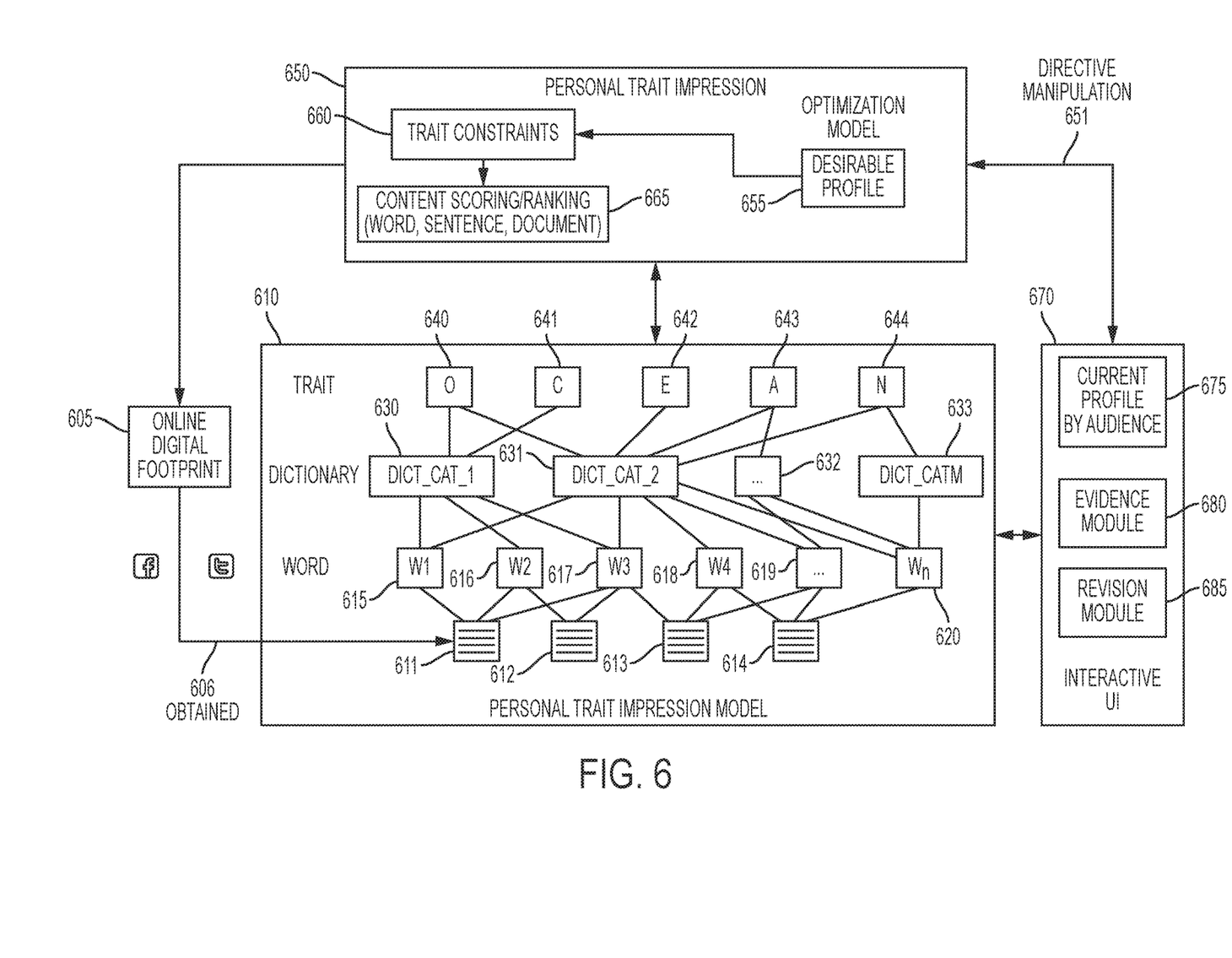
FIG. 6 is an exemplary diagram depicting an embodiment of a system for tone optimization recommendation.

FIG. 6 is an exemplary diagram depicting an embodiment of a system 600 for tone optimization recommendation. An example embodiment of a Facebook ToneAdvisor is shown that includes an online digital footprint 605, a personal trait impression model 610, a personal trait optimization model 650, and an interactive user interface 670.

The online digital footprint 605 may include Facebook posts and twitter posts associated with a user or users. The online digital footprint 605 may include a Facebook post that may be obtained by the personal trait impression model 610 as a post 611. The system 600 may use a Facebook Graph API to obtain 606 the Facebook post from the user's Facebook timeline. In an embodiment, the post 611 may be digital content and the Facebook Graph API may be an adaptor.

The personal trait impression model 610 may be a tone analysis module. The personal trait impression model 610 may be a social tone prediction module that uses Big 5 traits to generate a personality profile including the five OCEAN traits (Openness, Conscientiousness, Extraversion, Agreeableness, and Neuroticism) 640-644. These traits 640-644 may be computed at an overall level that includes all of a user's Facebook posts 611-614 and also at a level that includes an individual Facebook post 611. The personal trait impression model 610 may decompose the posts 611-614 as a bag of words 615-620 using standard processing techniques. A LIWC dictionary may define word categories 630-633 to capture the user's social traits. A word category score may be a normalized frequency of the words 615-617 that belong to the LIWC category 630 and are used in the post 611. The word category score may be used to identify traits 640-641. The identified traits 640-641 may describe a plurality of social tones inferred form the Facebook post 611.

The personal trait impression optimization model 650 may obtain the plurality of social tones from the personal trait impression model 610. The personal trait impression optimization model 650 may be a tone optimization module. The personal trait impression optimization model 650 may include a desirable profile 655. The personal trait impression model 650 may include trait constraints 660 and a content scoring/ranking component 665. The trait constraints 660 may include which characteristics are desirable for the desirable profile 655. The desirable profile 655 may describe a social tone profile that the user desires to share with a target audience. The trait constraints 660 may be a set of rules. The trait constraints 660 may be saved in a corpus. The trait constraints 660 may be learned from a corpus.

The content scoring/ranking component 665 may determine a scoring/ranking for each word, sentence, and/or post/document. The content scoring/ranking component 665 may provide a tone score for a Facebook post 611. The content scoring/ranking component 665 may provide a tone score for a plurality of posts 611-614. The personal trait impression optimization model 650 may provide a tone optimization recommendation to the interactive user interface 670 via directive manipulation 651.

The interactive user interface 670 may obtain the tone optimization recommendation and provide it to the user. The interactive user interface 670 may include a current profile by audience 675, an evidence module 680, and a revision module 685. The current profile by audience 675 may describe a current profile for the target audience. The evidence module 680 may provide an explanation for the social tone inferred from the Facebook post 611. The revision module 685 may include prioritized optimization recommendations for how to reduce a difference between the current profile by audience 675 and the desirable profile 655.

Figure 7:
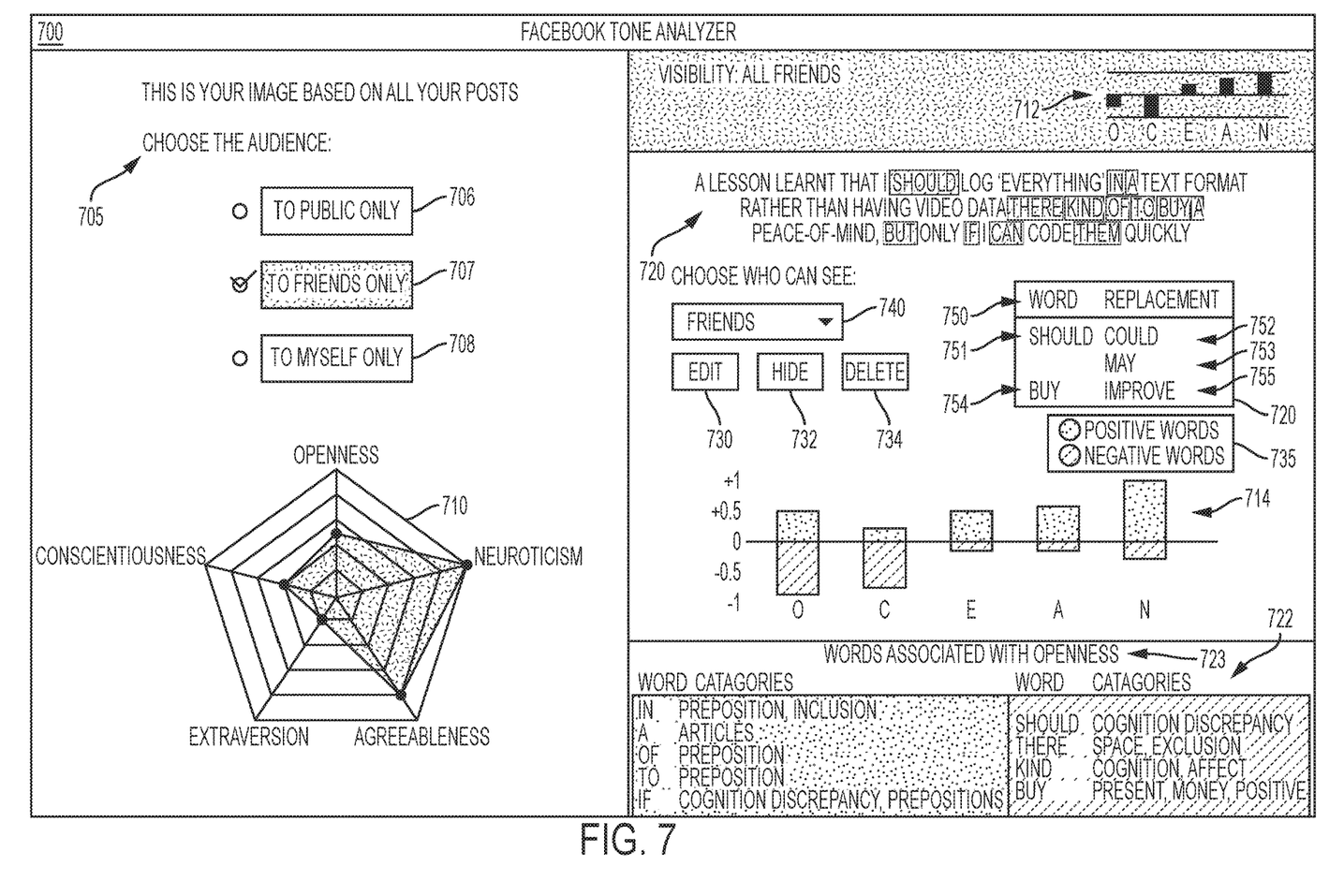
FIG. 7 is an exemplary diagram depicting an interactive user interface.

FIG. 7 is an exemplary diagram depicting an interactive user interface. The interactive user interface 700 may include a prompt 705 prompting a user to select a target audience from a plurality of options 706-708. The interactive user interface 700 may include social tone graphs 710, 712, and 714 visually depicting social tones inferred from the post 611. The interactive user interface 700 may provide word-level explanations indicating which words within a sentence 720 are used to infer the social tone for the post 611 and may provide an explanation box 722 explaining how the words are used to infer the social tone. The interactive user interface 700 may be used to analyze multiple tones, a combination of tones, a subset of tones, a variety of tone types, a single tone, and/or a single tone type. For example, the interactive user interface 700 may be used to analyze a sentence at a word level within the sentence 720 for openness 723. A user may interact with the interactive user interface 700 to implement a tone optimization recommendation. The interactive user interface 700 may include an edit button 730, a hide button 732, and a delete button 734. The edit button 730 may be used to edit the post 611. The hide button 732 may be used to hide the post 611 from the target audience. The delete button 734 may be used to delete the post 611. The interactive user interface 700 may include a target audience drop down menu 740 to assist the user with optimizing a social tone based on the target audience. The interactive user interface 700 may include a key 734 indicating positive and negative words for a social tone. A positive word may positively contribute to a social tone. A negative word may negatively contribute to a social tone. If a certain social tone is desirable, the interactive user interface 700 may suggest replacing a negative word with a positive word, a less negative word, and/or a neutral word.

The interactive user interface 700 may include a tone optimization recommendation. The tone optimization recommendation may be expressed in a tone optimization recommendation box 750. The tone optimization recommendation box 750 may be provided at a word, sentence, and/or post/document level. The tone optimization recommendation box 750 may prioritize modification suggestions for the digital content. For example, the tone optimization recommendation box 750 may prioritize which words to modify based on the desired tone and the selected target audience. For example, the target audience may include "friends" 707, 740; the desired tone to optimize for may include "openness" 723; and the tone optimization recommendation 750 may prioritize modifying the word "should" 751 as a top priority, and modifying the sentence by replacing the word "should" 751 with the word "could" 752 as the top optimization suggestion. Further describing the same example, the tone optimization recommendation box 750 may include the word "may" 753 as a secondary suggested replacement for the word "should" 751; and may also suggest replacing the word "buy" 754 with the word "improve" 755. The suggested recommendations in the tone optimization recommendation box 750 may be prioritized in a manner to optimize for single tone or a plurality of tones at a word, level, and/or post/document level.

In some embodiments, the tone optimization recommendation may be implemented by a user. In some embodiments, the tone optimization recommendation may be automatically implemented. In some embodiments, the tone optimization recommendation may be implemented as a combination of by a user and automatically. In an example embodiment, if the tone optimization recommendation box 750 includes multiple suggestions to modify a certain word (i.e., replacing "should" with either "could" or "may") the user may select which word to replace the certain word (i.e., "should") with; but for another suggested word change that may include a single word suggestion (i.e., replacing "buy" with "improve"), the tone optimization module 400 may automatically implement the tone optimization recommendation by substituting the suggested word (i.e., "improve") for the original word (i.e., "buy"). In another embodiment, the tone optimization module 400 may automatically substitute the most highly recommended word choice if given a variety of word replacement options.

Embodiments of the approach may improve an information handling system by providing a tone optimization recommendation. While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   obtaining digital content;
   using natural language processing and a trained tone prediction model to obtain a score from a reasoning algorithm, wherein the trained tone prediction model comprises capturing reasoning algorithms using trained models;
   using the trained tone prediction model to weigh the score and infer a current tone of the digital content;
   analyzing target audience content associated with a target audience to obtain a target audience tone;
   using the target audience tone to derive a desired tone for the target audience;
   creating, by a tone optimization generator, a linguistic tone optimization recommendation for the target audience to reduce a difference between the current tone and the desired tone, wherein the linguistic tone optimization recommendation includes a prioritized list of a plurality of linguistic modification suggestions, and wherein the tone optimization generator uses a correlation learned from the trained tone prediction model; and
   outputting the linguistic tone optimization recommendation to an interactive user interface that allows for iterative and selective implementation of the linguistic modification suggestions.

2. The method of claim 1, wherein the digital content is obtained as input from a user, and wherein the iterative and selective implementation is done at a word level.

3. The method of claim 1, further comprising:
   outputting an analysis of a plurality of tones inferred by the digital content.

4. The method of claim 1, wherein the interactive user interface is used to display an explanation for the current tone.

5. The method of claim 1, further comprising:
outputting an analysis of a plurality of tone types inferred by the digital content.

6. The method of claim 1, further comprising:
graphically displaying the current tone in a tone graph.

7. The method of claim 1, wherein the target audience comprises a plurality of entities, and wherein the target audience content comprises a plurality of digital footprints.

8. The method of claim 1, wherein the desired tone is derived using an expected mean of previous tones.

9. A computer program product stored in a non-transitory computer readable storage medium, comprising computer program code that, when executed by an information handling system, causes the information handling system to provide a tone optimization recommendation by performing actions comprising:
obtaining digital content;
using natural language processing and a trained tone prediction model to obtain a score from a reasoning algorithm, wherein the trained tone prediction model comprises capturing reasoning algorithms using trained models;
using the trained tone prediction model to weigh the score and infer a current tone of the digital content;
analyzing target audience content associated with a target audience to obtain a target audience tone;
using the target audience tone to derive a desired tone for the target audience;
creating, by a tone optimization generator, a linguistic tone optimization recommendation for the target audience to reduce a difference between the current tone and the desired tone, wherein the linguistic tone optimization recommendation includes a prioritized list of a plurality of linguistic modification suggestions, and wherein the tone optimization generator uses a correlation learned from the trained tone prediction model; and
outputting the linguistic tone optimization recommendation to an interactive user interface that allows for iterative and selective implementation of the linguistic modification suggestions.

10. The computer program product of claim 9, wherein the digital content comprises an aggregation of a plurality of digital footprints.

11. The computer program product of claim 9, further comprising:
outputting an analysis of a plurality of tones inferred by the digital content.

12. The computer program product of claim 9, wherein the interactive user interface is used to display an explanation for the current tone.

13. The computer program product of claim 9, further comprising:
outputting an analysis of a plurality of tone types inferred by the digital content.

14. The computer program product of claim 9, further comprising:
graphically displaying the current tone in a tone graph.

15. The computer program product of claim 9, wherein the desired tone is derived using content created by the target audience.

16. The computer program product of claim 9, wherein the target audience content comprises an aggregation of a plurality of digital footprints.

17. The computer program product of claim 9, further comprising:
obtaining another desired tone, wherein the another desired tone includes another desired tone for another target audience;
creating another tone optimization recommendation to reduce a difference between the current tone and the another desired tone; and
outputting the another tone optimization recommendation via the interactive user interface.

18. A system comprising:
one or more processors;
a memory coupled to at least one of the processors; and
a set of computer program instructions stored in the memory and executed by at least one of the processors to perform the actions of:
obtaining digital content;
using natural language processing and a trained tone prediction model to obtain a score from a reasoning algorithm, wherein the trained tone prediction model comprises capturing reasoning algorithms using trained models;
using the trained prediction model to weigh the score and infer a current tone of the digital content;
analyzing target audience content associated with a target audience to obtain a target audience tone;
using the target audience tone to derive a desired tone for the target audience;
creating, by a tone optimization generator, a linguistic tone optimization recommendation for the target audience to reduce a difference between the current tone and the desired tone, wherein the linguistic tone optimization recommendation includes a prioritized list of a plurality of linguistic modification suggestions, and wherein the tone optimization generator uses a correlation learned from the trained tone prediction model; and
outputting the linguistic tone optimization recommendation to an interactive user interface that allows for iterative and selective implementation of the linguistic modification suggestions.

19. The system of claim 18, wherein the set of computer program instructions stored in the memory and executed by at least one of the processors to perform additional actions of:
visually depicting the current tone and the linguistic tone optimization recommendation.

20. The system of claim 18, wherein the set of computer program instructions stored in the memory and executed by at least one of the processors to perform additional actions of:
outputting an explanation for the current tone.

* * * * *